J. EHERENMAN.
SHAFT SUPPORT.
APPLICATION FILED APR. 15, 1909.
946,023.
Patented Jan. 11, 1910.
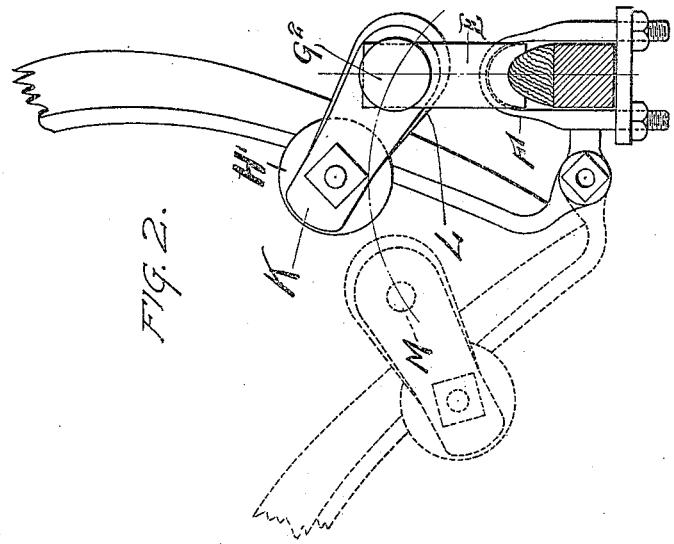
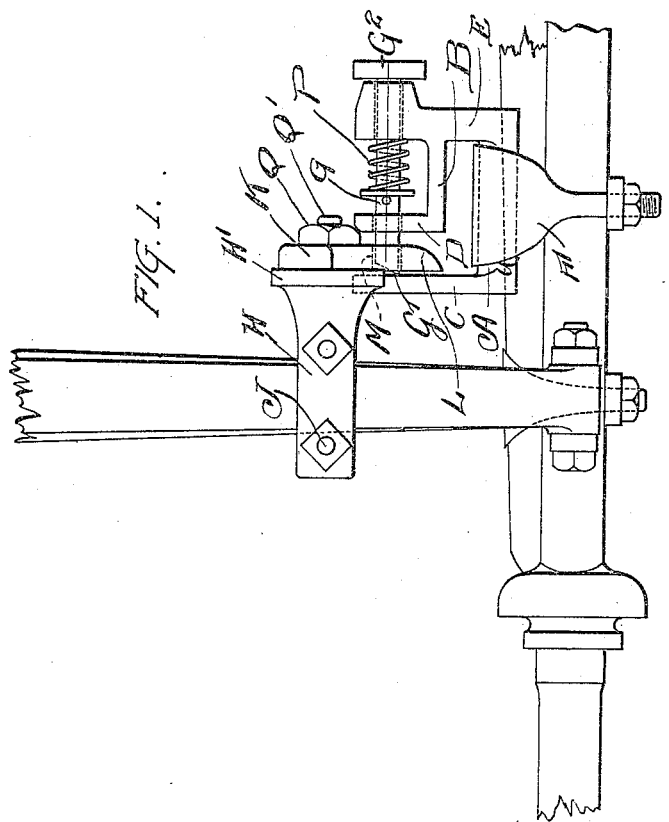

UNITED STATES PATENT OFFICE.

JOHN EHERENMAN, OF MENTONE, INDIANA.

SHAFT-SUPPORT.

946,023.  Specification of Letters Patent.  Patented Jan. 11, 1910.

Application filed April 15, 1909. Serial No. 490,185.

*To all whom it may concern:*

Be it known that I, JOHN EHERENMAN, a citizen of the United States, residing at Mentone, in the county of Kosciusko and State of Indiana, have invented a new and useful Shaft-Support, of which the following is a specification.

The object of the invention is to provide a novel and improved device designed to hold the shafts of buggies and other vehicles in an elevated position, while the buggy or other vehicle is not in use.

I attain these objects by the devices illustrated in the accompanying drawings, in which—

Figure 1 is a front elevation of the device applied to the vehicle. Fig. 2 is a side elevation thereof.

The attachment includes an angular support or bracket having two horizontal bars A and B, the former of which has at its opposite ends upright pieces C and E respectively. The piece or arm B projects inwardly from the upright E, and supports an intermediate upright guide piece D. The bracket is fastened to the axle of the buggy or other vehicle by a clip F. The upright piece E has a square hole, and the upright piece D has a round hole, at the upper end of each, through which holes an iron bolt or pin G passes. This pin is square where it passes through the upright piece E, and round where it passes through the upright D, and is beveled at one end thereof as indicated at G'. On the other end it has a knob G² for the purpose of manually operating the pin in lowering the shaft. A catch or device for engagement by the pin is supported by means of a flattened arm H fastened to the shaft by means of a clip around the shaft as shown at J. This arm has a round end or head H' with a flat surface at the end thereof. This arm supports a flat metal plate K which has a front beveled edge L and a hole M near said beveled edge. The plate is fastened to the head H' by a threaded stud Q' and a nut Q. The pin G is slidable in the uprights of the bracket loosely enough to be easily removed forward and backward by taking hold of the knob, and the bolt is squared where it passes through the upright E so as to prevent it from turning. Said bolt or pin is provided with a coiled spring P between the uprights D and E for the purpose of advancing said bolt to cause it to engage the plate K when the hole M registers with said pin. The fastening of the plate K by the stud and nut allows said plate to be angularly adjusted according to local conditions, to make the hole register with the pin when the shaft is lifted.

In use, when the shaft is raised the beveled edge at L on the plate K will strike the beveled end of the pin G, forcing said pin back until the pin reaches the hole M in the plate, when the pin will spring into said hole, thereby locking the shaft in raised position. By pulling the pin back, the catch is released and the shaft can be lowered for use.

The upright piece C serves to guide and retain the plate K to the pin and prevents accidental disengagement which might occur if the shaft bolts were loose or the shafts twisted or sprung.

I claim:

1. A shaft support comprising a bracket, means for attaching the same to the vehicle axle, a non-rotatable spring pin slidable lengthwise in said bracket parallel to the axle and having a beveled end, a plate having a hole in which the beveled end of the pin is engageable when the shaft is raised, and means for attaching the plate to the shaft and permitting angular adjustment of the plate in a plane at a right angle to the axis of the pin, to register the hole with the pin.

2. A shaft support comprising a bracket attachable to the vehicle axle, a pin supported by said bracket and slidable therein laterally toward and from the side of the shaft, a plate having a hole in which the pin is engageable when the shaft is raised, and means for attaching the plate to the shaft, including a pivot on which the plate is adjustable to vary its angular position, whereby the hole will register with the pin.

3. A shaft support comprising a bracket attachable to a vehicle axle and having uprights at opposite ends, a spring pin mounted to slide in one of said uprights toward and from the other, and a plate having means for its attachment to a shaft, and provided with a hole in which the pin is engageable when the shaft is raised to enter the plate between said uprights.

JOHN EHERENMAN.

Witnesses:
 MAHLON JEFFERTS,
 OSCAR METZ.